United States Patent
Furuta et al.

(10) Patent No.: US 7,508,097 B2
(45) Date of Patent: Mar. 24, 2009

(54) HIGH-VOLTAGE EQUIPMENT HOUSING AND HIGH-VOLTAGE CONNECTOR

(75) Inventors: Norifumi Furuta, Toyota (JP); Masami Inagaki, Toyota (JP); Masaaki Kaneko, Kariya (JP); Tatsuya Kawai, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 414 days.

(21) Appl. No.: 10/665,159

(22) Filed: Sep. 22, 2003

(65) Prior Publication Data

US 2005/0032404 A1 Feb. 10, 2005

(30) Foreign Application Priority Data

Sep. 18, 2002 (JP) ............... 2002-271384

(51) Int. Cl.
*F16P 3/20* (2006.01)
(52) U.S. Cl. .................................. 307/328
(58) Field of Classification Search ........... 307/328
See application file for complete search history.

(56) References Cited

U.S. PATENT DOCUMENTS 5,274,722 A * 12/1993 Saitoh et al. ............... 385/78
5,494,459 A * 2/1996 Brown et al. .............. 439/500
5,504,655 A * 4/1996 Underwood et al. ....... 361/707
5,913,691 A    6/1999 Clark et al.
6,361,356 B1   3/2002 Heberlein et al.
6,587,909 B1 * 7/2003 Olarig et al. ............... 710/302

FOREIGN PATENT DOCUMENTS

| JP | 55-170826 | 12/1980 |
|----|-----------|---------|
| JP | U 2-33501 | 3/1990 |
| JP | 03-001845 | 1/1991 |
| JP | A 03-190533 | 8/1991 |
| JP | A 05-221260 | 8/1993 |
| JP | A 7-212903 | 8/1995 |
| JP | A 2002-247755 | 8/2002 |

* cited by examiner

*Primary Examiner*—Michael J Sherry
*Assistant Examiner*—Dru M Parries
(74) *Attorney, Agent, or Firm*—Oliff & Berridge, PLC (57) ABSTRACT

A PCU having an inverter and the like includes a connector electrically connecting the PCU and external equipment located outside the PCU, a safety bar attaching the connector for preventing the connector from being touched, and an ECU detecting that an interlock circuit is opened via an interlock signal line in response to detachment of the safety bar to shut off supply of electric power to the PCU.

14 Claims, 7 Drawing Sheets

HIGH-VOLTAGE EQUIPMENT HOUSING AND HIGH-VOLTAGE CONNECTOR

BACKGROUND OF THE INVENTION

1. Field of the Invention

The present invention relates to a structure of high-voltage equipment as well as a high-voltage connector for safely conducting maintenance and inspection of the high-voltage equipment mounted on an electric vehicle. In particular, the present invention relates to a structure of high-voltage equipment and a high-voltage connector with which a high-voltage power supply can mechanically and electrically be shut off to allow maintenance and inspection to be conducted.

2. Description of the Background Art

A conventional electric vehicle is structured by placing a circuit-breaker unit and high-voltage equipment in a space isolated from a passenger compartment and a trunk and covering the space with a maintenance lid to hold the circuit-breaker unit and the high-voltage equipment within the closed space. For maintenance and inspection of the high-voltage equipment, sufficient safety measures for ensuring safety are indispensable. Japanese Patent Laying-Open No. 7-212903 discloses a structure of an electric vehicle for which maintenance and inspection can safely be conducted even if a maintenance worker forgets to turn off the breaker switch.

The disclosed vehicle structure includes a housing which holds high-voltage equipment driven by a high-voltage power supply, a maintenance lid covering the housing, an open/close sensor detecting that the maintenance lid is opened/closed, a circuit-breaker unit controlling supply and shutoff of a high-voltage electric power, and a control circuit controlling the circuit-breaker unit in such a way that supply of the high-voltage electric power to the high-voltage equipment is shut off based on a signal indicating a result of the detection by the open/close sensor.

The above vehicle structure has the open/close sensor detecting opening/closing of the maintenance lid to shut off, when the maintenance lid is removed, the supply of a high-voltage electric power to the high-voltage equipment by means of the circuit-breaker unit based on the sensor signal. Accordingly, when maintenance and inspection of the high-voltage equipment is conducted, the supply of the high-voltage electric power is automatically stopped to allow the maintenance and inspection work to safely be performed.

The disclosed vehicle structure described above, however, has the following problem. A PCU (Power Control Unit) mounted on the electric vehicle is a unit including such high-voltage equipment as inverter and converter and being held in a housing. The high-voltage equipment like the inverter and the converter has a high-voltage connector to which a power cable is connected. The high-voltage connector can be detached without opening the maintenance lid which covers the housing. Then, when the high-voltage connector is detached, it could occur that the circuit-breaker unit does not stop the supply of the high-voltage electric power and thus the high-voltage electric power is still being supplied. At this time, the high-voltage connector is detached with the energized state maintained. In such a case, it is necessary that sufficient safety from a high voltage is ensured for an operator conducting maintenance and inspection.

SUMMARY OF THE INVENTION

It is an object of the present invention to provide a high-voltage equipment housing sufficiently ensuring safety of an operator who works on high-voltage equipment.

It is another object of the present invention to provide a high-voltage equipment housing sufficiently ensuring safety of an operator in conducting maintenance of high-voltage equipment.

It is still another object of the present invention to provide a high-voltage connector sufficiently ensuring safety of an operator who works on high-voltage equipment.

It is a further object of the present invention to provide a high-voltage connector sufficiently ensuring safety of an operator in conducting maintenance of high-voltage equipment.

A high-voltage equipment housing according to an aspect of the present invention holds high-voltage equipment therein. The high-voltage equipment housing includes a connection unit for making an electrical connection between external equipment located outside the high-voltage equipment housing and the high-voltage equipment, an attaching unit for attaching the connection unit to prevent a mechanical connection of the connection unit from being released by the connection unit only, and a changing unit for changing a state of the electrical connection between the high-voltage equipment and the external equipment by means of the connection unit to a disconnected state in response to detachment of the attaching unit.

A high-voltage connector, for example, serving as the connection unit is provided to the high-voltage equipment housing. The connection unit makes an electrical connection between the external equipment located outside the high-voltage equipment housing and the high-voltage equipment. As the connection unit is attached by the attaching unit, the mechanical connection of the connection unit is not released by the connection unit only. In response to detachment of the attaching unit, the changing unit changes the state of the electrical connection between the high-voltage equipment and the external equipment by means of the connection unit to the disconnected state. Thus, when an operator is going to detach the high-voltage connector or the connection unit, the operator detaches, before releasing the mechanical connection by withdrawing the high-voltage connector, the attaching unit which prevents a situation that only the mechanical connection is released. The detachment of the attaching unit causes the changing unit to change the state of the electrical connection to the disconnected state thereby change a state where a high voltage is supplied or a high voltage can be supplied to a state where a high voltage cannot be supplied. Accordingly, the high-voltage equipment housing sufficiently ensuring safety of an operator working on high-voltage equipment can be provided.

Preferably, the changing unit of the high-voltage equipment housing may include an interlock circuit attached to the attaching unit and a circuit changing the state of the electrical connection to the disconnected state when the interlock circuit opens in response to detachment of the attaching unit.

The interlock circuit is provided to the attaching unit. When the attaching unit is detached, the interlock circuit opens. As the interlock circuit opens, the state of electrical connection is changed to the disconnected state. Accordingly, the high-voltage equipment housing sufficiently ensuring safety of an operator working on high-voltage equipment can be provided.

Still preferably, the high-voltage equipment housing may further include an upper lid for preventing the high-voltage equipment from being touched and a prevention unit connected to the attaching unit for preventing the upper lid from being attached/detached by the upper lid only.

When the upper lid is opened, there is a possibility that an operator touches the high-voltage equipment like an inverter and a converter held in the high-voltage equipment housing. The prevention unit then prevents the upper lid from being attached/detached by the upper lid only. As the prevention unit is connected to the attaching unit, the upper lid is never removed unless the attaching unit is detached. Thus, the attaching unit is detached when the upper lid is to be removed. Accordingly, the changing unit changes, in response to the detachment of the attaching unit, the state of the electrical connection between the high-voltage equipment and the external equipment by means of the connection unit to the disconnected state. In a case where the upper lid of the high-voltage equipment housing is removed as well as the case where the high-voltage connector or the connection unit is detached by the operator, the state is changed from a state where a high voltage is supplied or a high voltage can be supplied to a state where a high voltage cannot be supplied. Accordingly, the high-voltage equipment housing sufficiently ensuring safety of an operator working on high-voltage equipment can be provided.

Still preferably, the high-voltage equipment housing may further include a holding unit for mounting the high-voltage equipment housing on a vehicle.

The high-voltage equipment housing is held when the housing is mounted by the holding unit on the vehicle. In this case, the vehicle is any of an electric vehicle having only an electric motor as a power source, a hybrid vehicle having at least two power sources that are an engine and an electric motor for example, and a fuel-cell vehicle having a fuel cell as a drive source, and has a motor generator or the like which is a high-voltage drive source for driving the vehicle. The high-voltage equipment held in the high-voltage equipment housing supplies a high-voltage power to electric equipment which is the drive source.

A high-voltage connector according to another aspect of the present invention makes an electrical connection between high-voltage equipment and another equipment different from the high-voltage equipment. The high-voltage connector includes a connection unit for mechanically establishing the electrical connection, and a changing unit for changing a state of the electrical connection between the high-voltage equipment and the another equipment to a disconnected state in response to release of the mechanical connection by means of the connection unit.

The high-voltage connector has a male plug and a female jack serving as the connection unit. With the male plug and the female jack, the high-voltage equipment and another equipment are electrically connected. The connection unit, the male plug and the female jack are mechanically connected to each other. In response to release of the mechanical connection by the connection unit, the changing unit changes the state of the electrical connection between the high-voltage equipment and that another equipment by means of the connection unit to the disconnected state. Thus, when an operator is going to detach the male plug and the female plug of the high-voltage connector that serve as the connection unit, the changing unit changes the state of electrical connection to the disconnected state thereby changes a state where a high voltage is supplied or a high voltage can be supplied to a state where a high voltage cannot be supplied. Accordingly, the high-voltage connector sufficiently ensuring safety of an operator working on high-voltage equipment can be provided.

Still more preferably, the changing unit of the high-voltage connector may include an interlock circuit attached to the connector and a circuit changing the state of the electrical connection to the disconnected state when the interlock circuit opens in response to release of the mechanical connection by the connection unit.

The connector is provided with the interlock circuit. When an operator detaches the male plug and the female plug of the high-voltage connector that serve as the connection unit, the interlock circuit opens. As the interlock circuit opens, the state of electrical connection is changed to the disconnected state. Accordingly, the high-voltage connector sufficiently ensuring safety of an operator working on high-voltage equipment can be provided.

Still more preferably, the connection unit of the high-voltage equipment housing may be placed at a position touchable by a hand of a person.

The connection unit of the high-voltage equipment housing is placed at a position touchable by a hand of a person. Then, when an operator is going to detach the high-voltage connector or the connection unit with the hand, the operator detaches, before releasing the mechanical connection by withdrawing the high-voltage connector, the attaching unit which prevents a situation that only the mechanical connection is released. The state is accordingly changed to a state where a high voltage cannot be supplied. Accordingly, the high-voltage equipment housing sufficiently ensuring safety of an operator working on high-voltage equipment can be provided.

Still more preferably, the connection unit of the high-voltage connector may be placed at a position touchable by a hand of a person.

When an operator detaches the male plug and the female plug of the high-voltage connector that serve as the connection unit, the changing unit changes the state of electrical connection to the disconnected state thereby changes the state to a state where a high voltage cannot be supplied. Accordingly, the high-voltage connector sufficiently ensuring safety of an operator working on high-voltage equipment can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings. In the following description and drawings, like components are denoted by like reference characters and have the same name and the same function. Accordingly, detailed description thereof is not repeated here.

First Embodiment

Figure 1:
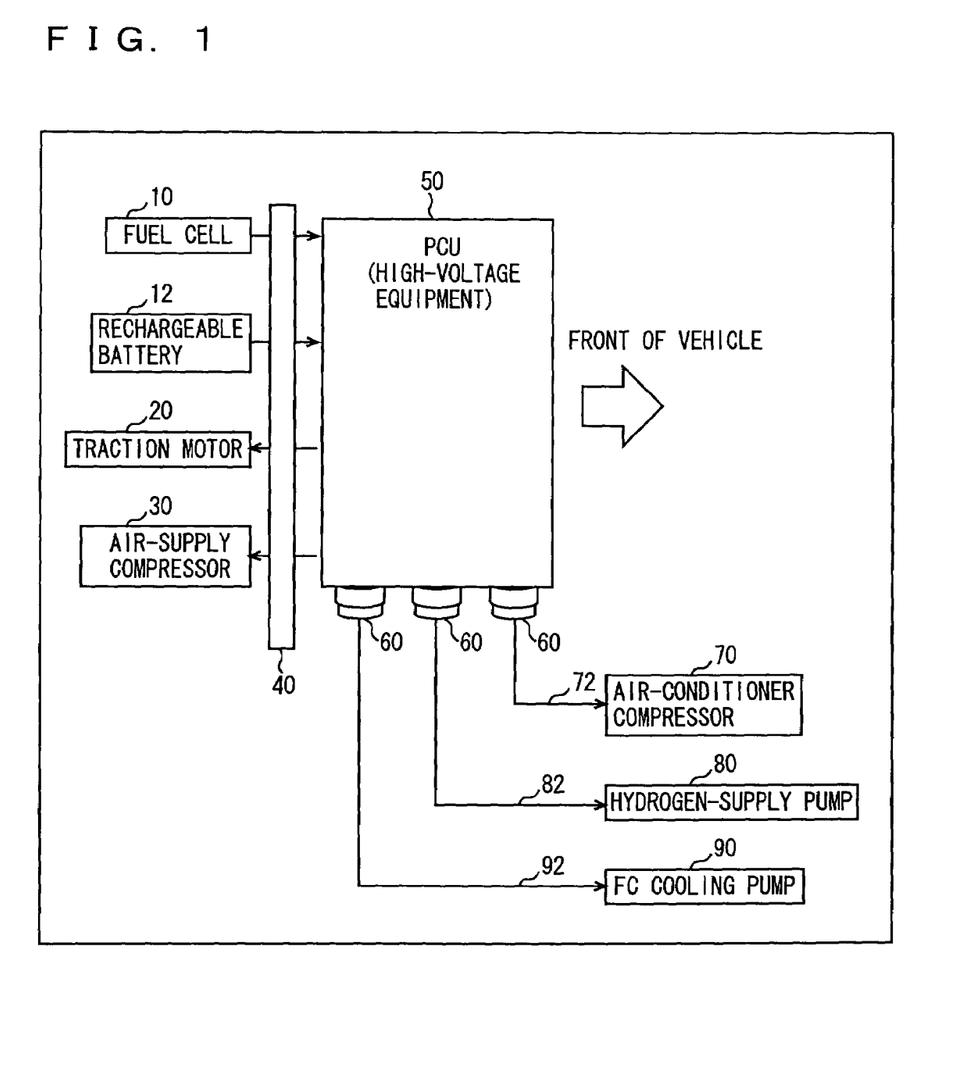
FIG. 1 shows a power train of a vehicle on which a PCU box is mounted according to a first embodiment of the present invention.

Referring to FIG. 1, a vehicle is described that is a vehicle on which a high-voltage equipment housing (hereinafter referred to as PCU box) is mounted according to this embodiment and which drives an electric motor by a fuel cell and a rechargeable battery. The block diagram of FIG. 1 is a schematic diagram of the vehicle as seen from the above. The vehicle includes a fuel cell (FC) 10 generating electricity by a reaction of hydrogen supplied from a hydrogen-storing alloy or hydrogen supplied through reformation of methanol or the like into hydrogen and oxygen contained in the air, a traction motor 20 for running the vehicle, a rechargeable battery 12 which is charged with electricity generated by traction motor 20 functioning as a generator in a regenerative breaking operation and which discharges electricity in an accelerating operation so as to compensate for a shortage of electricity that cannot be covered by an output from fuel cell 10, and an air-supply compressor 30 for supplying oxygen to fuel cell 10. In the PCU box of this embodiment, a PCU (Power Control Unit) 50 which is such high-voltage equipment as inverter and converter is held. These fuel cell 10, rechargeable battery 12, traction motor 20 and air-supply compressor 30 are connected to PCU 50 by high-voltage cables. The high-voltage cables connected to these units are connected to PCU 50 by connectors. The connectors are placed to be close to an attachment 40 in an engine room for example, so that the connectors cannot be detached unless the PCU box holding PCU 50 is taken out from the engine room.

To PCU 50, an air-conditioner compressor 70, a hydrogen-supply pump 80 and an FC cooling pump 90 for cooling fuel cell 10 are connected. PCU 50 and air-conditioner compressor 70 are connected by a three-phase power cable 72, PCU 50 and hydrogen-supply pump 80 are connected by a three-phase power cable 82 and PCU 50 and FC cooling pump 90 are connected by a three-phase power cable 92. Accordingly, the PCU box holding PCU 50 has connectors 60 for connecting the three three-phase power cables respectively, in addition to the above-mentioned connectors placed to be close to attachment 40 in the engine room for example. Connectors 60 are detailed hereinlater.

The power train shown in FIG. 1 is an exemplary power train of the vehicle on which the PCU box holding PCU 50 according to this embodiment is mounted. Any power train except for the above-described one may be used that is a power train for high-voltage equipment of, for example, an electric vehicle or a hybrid electric vehicle.

Figure 2:
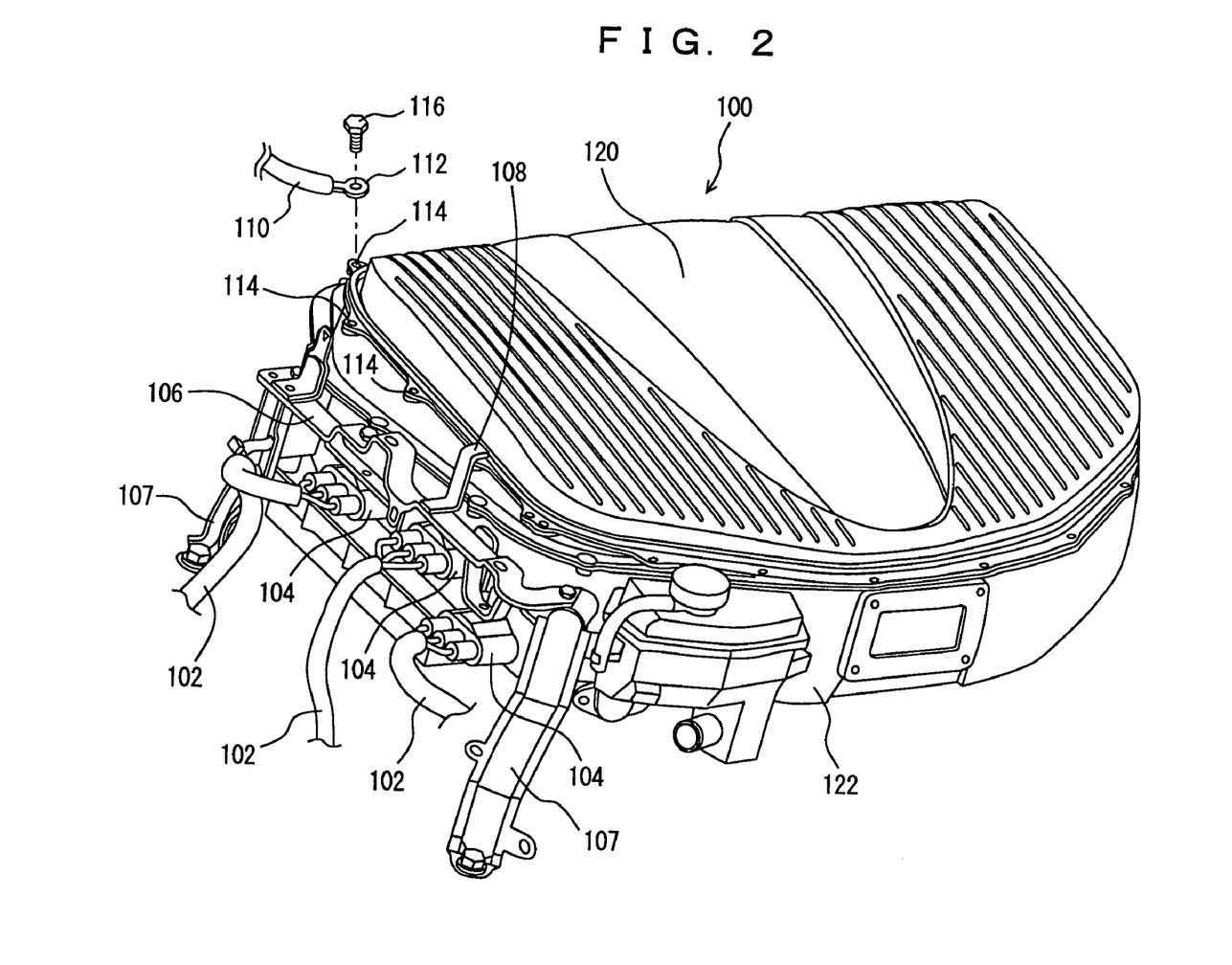
FIG. 2 is an external view of the PCU box according to the first embodiment of the present invention.

FIG. 2 shows an external view of the PCU box according to this embodiment. As shown in FIG. 2, this PCU box 100 is formed of a PCU box cabinet 122 and a PCU upper cover 120 provided on cabinet 122. To a side of PCU box 100, a connector 104 connected to a power cable 102 through which three-phase electric power is passed is connected. Power cable 102 and connector 104 correspond to three-phase power cables 72, 82 and 92 and connectors 60 described in connection with FIG. 1. PCU upper cover 120 is attached to PCU box cabinet 122 by inserting attachment bolts 116 into a plurality of upper cover attachment holes 114 thereby tightening nuts.

As shown in FIG. 2, attachment bolt 116 for fixing PCU box cabinet 122 and PCU upper cover 120 together is tightened together with a crimp contact 112 connected to an interlock signal line 110. More specifically, as attachment bolts 116 are withdrawn for removing upper cover 120 of PCU box 100 shown in FIG. 2, interlock signal line 110 connected to crimp contact 112 is also detached so that it is detected that PCU upper cover 120 is removed.

Further, as shown in FIG. 2, a safety bar 106 is provided to connectors 104 of PCU box 100 in order to prevent an operator from touching connectors 104. Safety bar 106 has an upper cover detachment prevention hook 108. Thus, so long as safety bar 106 is not detached, PCU upper cover 120 cannot be removed even if all bolts 116 attached to upper cover attachment holes 114 are removed. Moreover, as shown in FIG. 2, a stay 107 for mounting PCU box 100 on the vehicle is connected to safety bar 106 with bolts.

Figure 3:
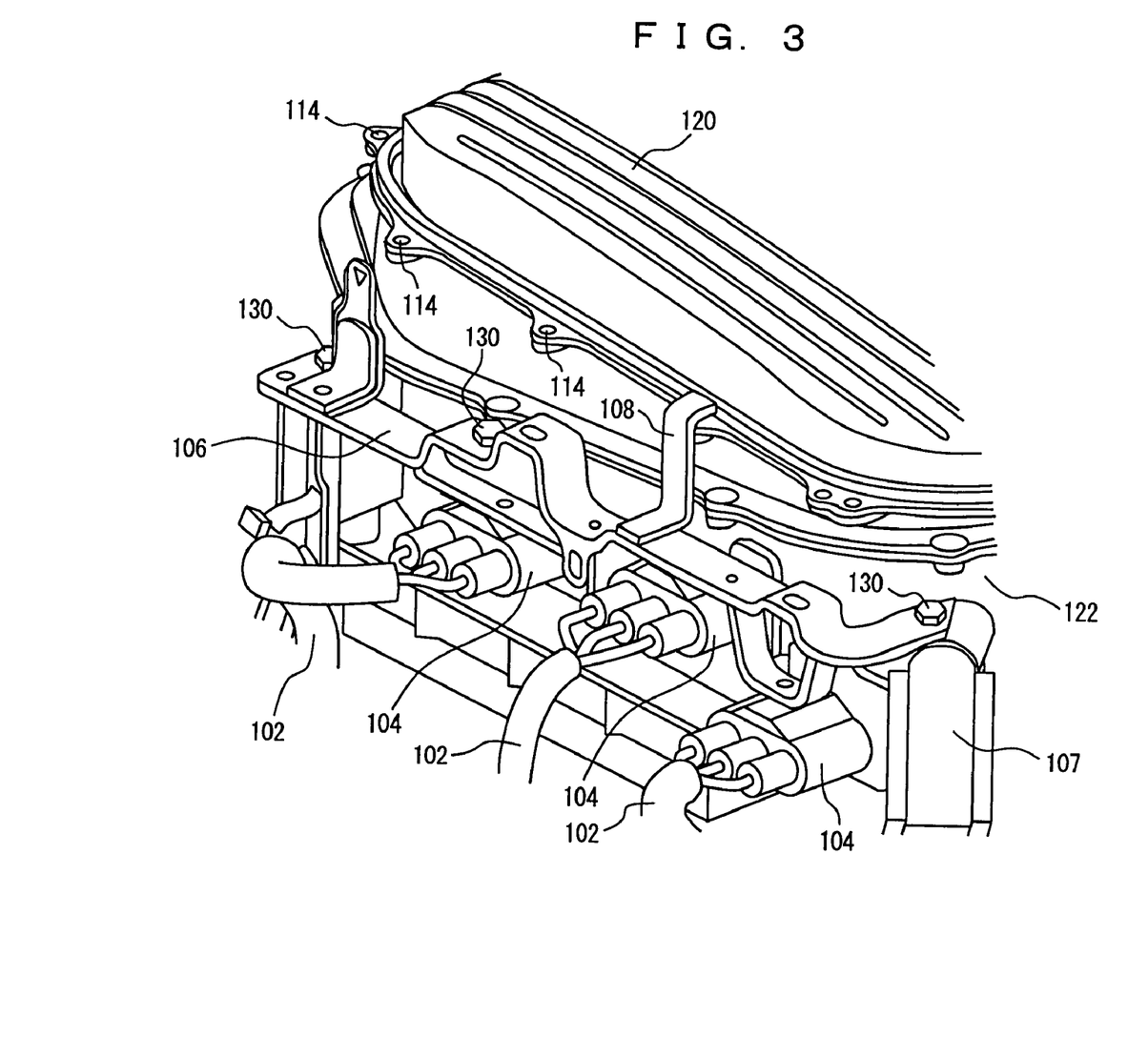
FIG. 3 is an enlarged view of FIG. 2.

FIG. 3 shows an enlarged perspective view of the side of PCU box 100 in FIG. 2. As shown in FIG. 3, safety bar 106 is attached to PCU box cabinet 122 by inserting safety bar attachment bolts 130 into safety bar attachment holes and tightening nuts. As described above, upper cover detachment prevention hook 108 is fixed to safety bar 106 and accordingly, so long as all attachment bolts 130 of safety bar 106 are not removed, PCU upper cover 120 cannot be removed from PCU box cabinet 122 even if all bolts 116 attached to upper cover attachment holes 114 are removed.

Figure 4:
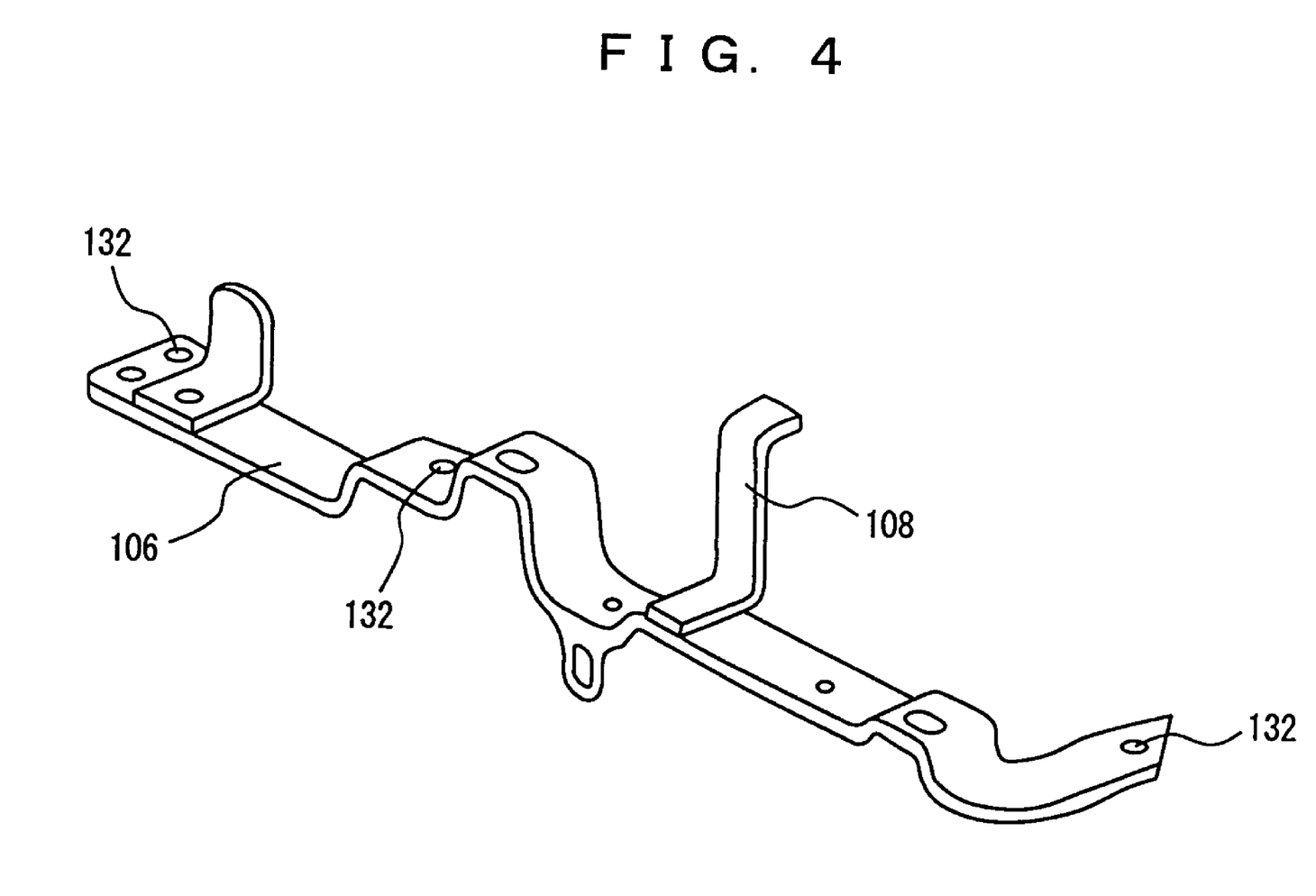
FIG. 4 shows a safety bar shown in FIG. 2.

Referring to FIG. 4, a description is given below of safety bar 106. As shown in FIG. 4, safety bar 106 is shaped in such a way that three connectors 104 will not be touched by an operator, and has a plurality of safety bar attachment holes 132. As described above, safety bar 106 is attached to PCU box cabinet 122 by inserting safety bar attachment bolts 130 into safety bar attachment holes 132 and tightening nuts. Further, as shown in FIG. 4, upper cover detachment prevention hook 108 is fixed in advance to safety bar 106.

Attachment bolts 116 fit in upper cover attachment hole 114 may be tightened together with interlock signal line 110 as shown in FIG. 2. Alternatively, safety bar attachment bolt 130 inserted into safety bar attachment hole 132 shown in FIG. 4 may be tightened together with interlock signal line 110.

Figure 5:
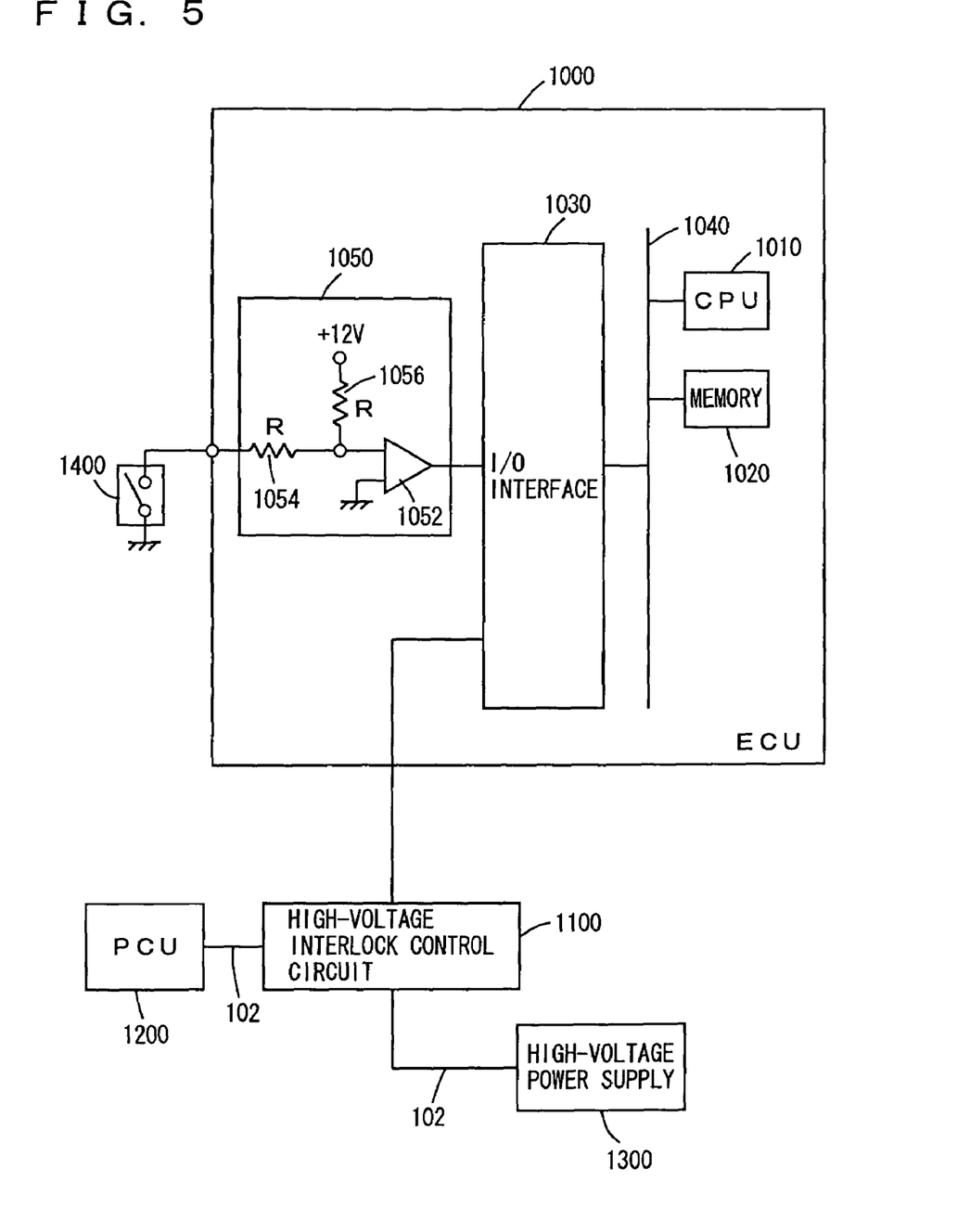
FIG. 5 is a control block diagram including an ECU managing a power supply.

Referring to FIG. 5, a description is given below of a control block diagram of a system executing control when interlock signal line 110 of PCU box 100 of this embodiment is detached. This control is executed by an ECU (Electronic Control Unit) 1000 shown in FIG. 5.

ECU 1000 includes a CPU (Central Processing Unit) 1010, a memory 1020 storing a program executed by CPU 1010 as well as various data, an input/output interface 1030, a bus 1040 connecting CPU 1010, memory 1020 and input/output interface 1030, and an interlock circuit 1050. Interlock circuit 1050 is connected to an interlock 1400 which is located outside the ECU.

Interlock circuit 1050 includes two resistors 1054 and 1056 and a comparator 1052.

When interlock 1400 is closed (normal state), an interlock signal of Lo level is output from comparator 1052 and a high-voltage power supply signal of Hi level is output to a high-voltage interlock control circuit 1100.

More specifically, as interlock 1400 is closed, the interlock signal of Lo level is input from interlock circuit 1050 to CPU 1010 via input/output interface 1030. CPU 1010 detecting the interlock signal of Lo level then outputs the high-voltage power supply signal of Hi level to high-voltage interlock control circuit 1100 via input/output interface 1030 and accordingly, high-voltage interlock control circuit 1100 exercises control to allow a high-voltage power supply 1300 to supply a high-voltage to a PCU 1200.

On the contrary, when interlock 1400 is opened (abnormal state), comparator 1052 outputs an interlock signal of Hi level so that a high-voltage power supply instruction signal of Lo level is output from CPU 1010 to high-voltage interlock control circuit 1100.

More specifically, as interlock 1400 is opened, the interlock signal of Hi level is input from interlock circuit 1050 to CPU 1010 via input/output interface 1030. CPU 1010 detecting the interlock signal of Hi level then outputs the high-voltage power supply instruction signal of Lo level to high-voltage interlock control circuit 1100 via input/output interface 1030 and accordingly, high-voltage interlock control circuit 1100 exercises control to shut off a high-voltage supplied from high-voltage power supply 1300 to PCU 1200.

Comparator 1052 outputs a signal of Hi level when two input voltages have a large difference therebetween and outputs a signal of Lo level when two input voltages have a small difference therebetween.

High-voltage interlock control circuit 1100 is connected to ECU 1000 via input/output interface 1030. High-voltage interlock control circuit 1100 is connected to PCU 1200 and high-voltage power supply 1300 via power cable 102.

Figure 6:
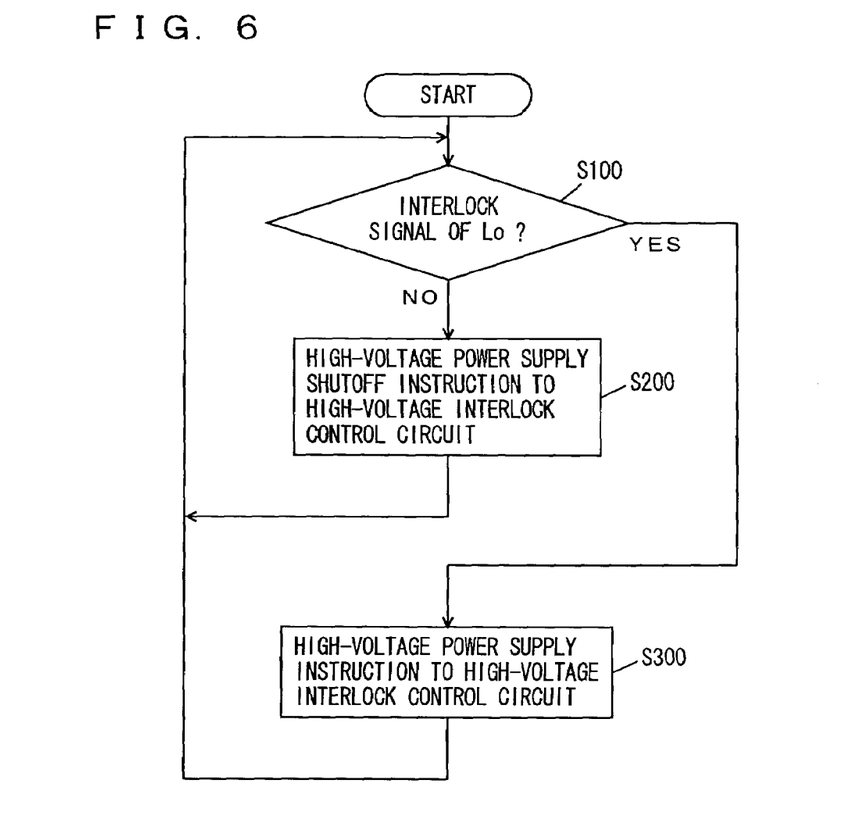
FIG. 6 is a flowchart of a process followed by the ECU.

Referring to FIG. 6, a control structure of a program executed by CPU 1010 shown in FIG. 5 is described.

In step (hereinafter abbreviated as S) 100, CPU 1010 determines whether or not an interlock signal is Lo level. The interlock signal is input from comparator 1052 of interlock circuit 1050 via input/output interface 1030. If the interlock signal has Lo level (YES in S100), this process proceeds to S300. If not (NO in S100), the process proceeds to S200.

In S200, CPU 1010 outputs a high-voltage power supply shutoff instruction to high-voltage interlock control circuit 1100. The process thereafter returns to S100.

In S300, CPU 1010 outputs a high-voltage power supply instruction to high-voltage interlock control circuit 1100. The process then returns to S100.

According to the structure and flowchart described above, an operation of PCU box 100 and ECU 1000 is described.

As shown in FIG. 2, in a case where interlock signal line 110 of PCU box 100 is tightened together with the upper cover attachment bolt 116 fit in upper cover attachment hole 114 or tightened together with safety bar attachment bolt 130 fit in safety bar attachment hole 132, interlock 1400 is in a closed state. Accordingly, the interlock signal of Lo level is output from comparator 1052.

CPU 1010 then detects that the interlock signal has Lo level (YES in S100) to output the high-voltage power supply instruction to high-voltage interlock control circuit 1100 (S300). At this time, the high-voltage power supply instruction signal of Hi level is output. Receiving this signal, high-voltage interlock control circuit 1100 electrically connects high-voltage power supply 1300 and PCU 1200 by power cable 102.

When an operator removes upper cover attachment bolt 116 or safety bar attachment bolt 130 of PCU box 100 mounted on the vehicle, interlock signal line 100 is accordingly detached. At this time, interlock 1400 is in an opened state. The interlock signal of Hi level is thus output from comparator 1052.

CPU 1010 detects that the interlock signal is not of Lo level (NO in S100) to output the high-voltage power supply shutoff instruction to high-voltage interlock control circuit 1100 (S200). At this time, the high-voltage power supply instruction signal of Lo level is output. Receiving this signal, high-voltage interlock control circuit 1100 disconnects high-voltage power supply 1300 from PCU 1200 that have electrically been connected by power cable 102 so as to eliminate the possibility that a high-voltage power is supplied to PCU 1200.

Figure 7:
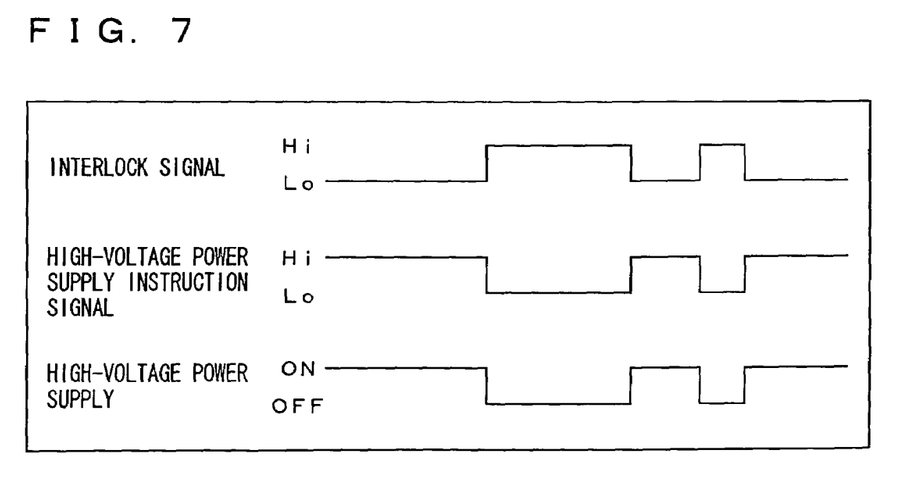
FIG. 7 is a timing chart of a control signal of the ECU.

FIG. 7 shows a timing chart of the above-described operation. As shown in FIG. 7, the interlock signal has Lo level in a case where interlock signal line 110 is connected to upper cover attachment hole 114 or interlock signal line 110 is connected to safety bar attachment hole 132. In this case, the high-voltage power supply instruction signal of Hi level is output from CPU 1010 to high-voltage interlock control circuit 1100 via input/output interface 1030. In response to the fact that the high-voltage power supply instruction signal has Hi level, high-voltage interlock control circuit 1100 causes the high-voltage power to be supplied and thus the high-voltage power is supplied from high-voltage power supply 1300 to PCU 1200 via power cable 102.

On the other hand, when upper cover attachment bolt 116 fit in upper cover attachment hole 114 is removed or safety bar attachment bolt 130 fit in safety bar attachment hole 132 is removed and thereby interlock signal line 110 is detached from PCU box cabinet 122, the interlock signal changes from Lo level to Hi level. In response to the change of the interlock signal from Lo level to Hi level, CPU 1010 changes the high-voltage power supply instruction signal output to high-voltage interlock control circuit 1100 via input/output interface 1030 from Hi level to Lo level. In response to the change from Hi level to Lo level of the high-voltage power supply instruction signal received from CPU 1010, high-voltage interlock control circuit 1100 shuts off the high-voltage power supply from high-voltage power supply 1300 to PCU 1200 via power cable 102.

As heretofore discussed, when an operator tries to detach the safety bar or the upper cover of the PCU box of this embodiment, the interlock circuit operates to shut off the supply of the high-voltage power to the PCU. Therefore, if the safety bar is removed for detaching the connectors or the PCU upper cover is removed for inspection of the inside of the PCU box, the interlock circuit operates to shut off the power supply from the high-voltage power supply. In this way, the PCU box which sufficiently ensures safety of the operator working on the high-voltage equipment can be provided.

Second Embodiment

Figure 8:
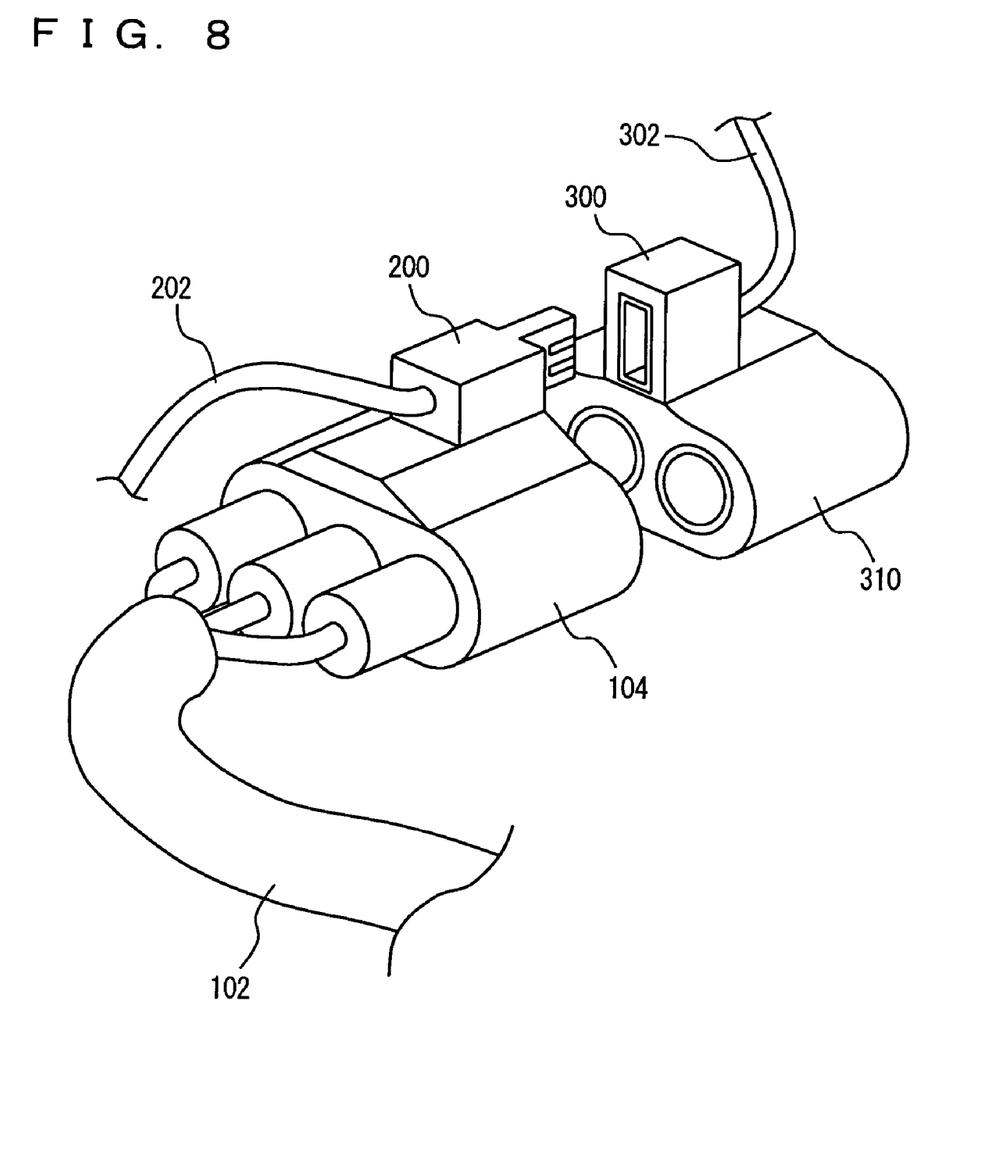
FIG. 8 is an external view of a connector according to a second embodiment of the present invention.

Referring to FIG. 8, a high-voltage connector is described according to this embodiment. To the high-voltage connector of this embodiment, the interlock signal line described in connection with the first embodiment is connected. Here, a structure and a flowchart are the same as those of the first embodiment except for the above characteristic and thus detailed description thereof is not repeated here.

With reference to FIG. 8, the high-voltage connector according to this embodiment includes a connector 104, a connector joint 310 fit on connector 104, an interlock male unit 200 provided on connector 104, and an interlock female unit 300 provided on connector joint 310.

An interlock signal line 202 is connected to interlock male unit 200 and an interlock signal line 302 is connected to interlock female unit 300. FIG. 8 shows that connector 104 and connector joint 310 are in a disconnected state.

When connector 104 and connector joint 310 are disconnected from each other, interlock male unit 200 and interlock female unit 300 are accordingly disconnected from each other and interlock 1400 shown in FIG. 5 is in the opened state.

When connector 104 and connector joint 310 are connected, interlock male unit 200 and interlock female unit 300 are accordingly connected and interlock 1400 shown in FIG. 5 is in the closed state.

A description is given below of an operation of the PCU box and the ECU using the high-voltage connector having the above-described structure.

If connector 104 of PCU box 100 is connected to connector joint 310, interlock male unit 200 and interlock female unit 300 are also connected so that the high-voltage power supply instruction signal of Hi level is output from CPU 1010 to high-voltage interlock control circuit 1100. Accordingly, high-voltage interlock control circuit 1100 allows a high-voltage power to be supplied from high-voltage power supply 1300 to PCU 1200 via power cable 102.

If an operator disconnects connector 104 from connector joint 310 so that they are in the disconnected state, interlock male unit 200 and interlock female unit 300 are accordingly separated from each other and the interlock signal changes from Lo level to Hi level. Detecting this change, CPU 1010 changes the high-voltage power supply instruction signal to high-voltage interlock control circuit 1100 from Hi level to Lo level.

In response to the change of the high-voltage power supply instruction signal from Hi level to Lo level, high-voltage interlock control circuit 1100 shuts off the high-voltage power supply. Then, the high-voltage voltage power supplied from high-voltage power supply 1300 to PCU 1200 via power cable 102 is shut off.

As discussed above, the high-voltage connector according to this embodiment has the connector provided with the interlock male unit and the connector joint provided with the interlock female unit. When the connector and the connector joint are connected, the interlock male unit is fit in the interlock female unit and accordingly the interlock is closed. When the connector is detached from the connector joint, the interlock male unit and the interlock female unit are separated from each other so that the interlock is opened. Thus, in response to the detachment by an operator of the high-voltage connector from the connector joint, the interlock is opened to shut off the supply of the high-voltage power from the high-voltage power supply to the PCU. In this way, the high-voltage connector which sufficiently ensures safety of the operator working on the high-voltage equipment can be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A high-voltage equipment housing holding high-voltage equipment that includes active devices therein, comprising:
    connection means for making an electrical connection between external equipment located outside said high-voltage equipment housing and said high-voltage equipment;
    attaching means for preventing said connection means from being touched so as to prevent a mechanical connection of said connection means from being released by said connection means, wherein the attaching means is attached to a body of the housing;
    an interlock control circuit;
    a CPU controlling the interlock control circuit to change a state of a high voltage supply to said connection means that connects between said high-voltage equipment and said external equipment to a disconnected state in response to detachment of said attaching means and prior to any movement of the connection means;
    an upper lid attached to the housing for preventing said high-voltage equipment from being touched, wherein said upper lid is fixed to the housing with a bolt; and
    prevention means connected to said attaching means for preventing, by attaching said attaching means to said high-voltage equipment housing, said upper lid from being detached, wherein said prevention means restricts removal of the upper lid even when the bolt is removed, unless the attaching means is removed.

2. The high-voltage equipment housing according to claim 1, wherein
    an interlock circuit is attached to said attaching means and a circuit changing said state of the electrical connection to said disconnected state when said interlock circuit opens in response to detachment of said attaching means.

3. The high-voltage equipment housing according to claim 1, further comprising holding means for mounting said high-voltage equipment housing on a vehicle.

4. The high-voltage equipment housing according to claim 2, further comprising holding means for mounting said high-voltage equipment housing on a vehicle.

5. The high-voltage equipment housing according to claim 1, wherein
    said connection means is placed at a position touchable by a hand of a person when not prevented by the attaching means.

6. The high-voltage equipment housing according to claim 1, wherein the attaching means is a bar that extends into a shape that, when attached to the high-voltage equipment housing, prevents said connection means from being touched by an operator.

7. The high-voltage equipment housing according to claim 1, wherein the prevention means is a hook-shaped member.

8. A high-voltage equipment housing holding high-voltage equipment that includes active devices therein, comprising:
    a connection unit making an electrical connection between external equipment located outside said high-voltage equipment housing and said high-voltage equipment;
    an attaching unit preventing said connection unit from being touched so as to prevent a mechanical connection of said connection unit from being released by said connection unit, wherein the attaching unit is attached to a body of the housing;
    an interlock control circuit;
    a CPU controlling the interlock control circuit to change a high-voltage supply state of the electrical connection between said high-voltage equipment and said connection unit to a disconnected state in response to detachment of said attaching unit and prior to any movement of the connection means;
    an upper lid attached to the housing for preventing said high-voltage equipment from being touched, wherein the upper lid is fixed to the housing with a bolt; and
    a prevention unit connected to said attaching unit to prevent, by attaching said attaching unit to said high-voltage equipment housing, said upper lid from being detached, wherein the prevention unit restricts removal of the upper lid even when the bolt is removed, unless the attaching unit is removed.

9. The high-voltage equipment housing according to claim 8, wherein
    an interlock circuit attached to said attaching unit and a circuit changing said state of the electrical connection to said disconnected state when said interlock circuit opens in response to detachment of said attaching unit.

10. The high-voltage equipment housing according to claim 8, further comprising a holding unit for mounting said high-voltage equipment housing on a vehicle.

11. The high-voltage equipment housing according to claim 9, further comprising a holding unit for mounting said high-voltage equipment housing on a vehicle.

12. The high-voltage equipment housing according to claim 8, wherein
   said connection unit is placed at a position touchable by a hand of a person when not prevented by the attaching unit.

13. The high-voltage equipment housing according to claim 8, wherein the attaching unit is a bar that extends into a shape that, when attached to the high-voltage equipment housing, prevents said connection unit from being touched by an operator.

14. The high-voltage equipment housing according to claim 8, wherein the prevention unit is a hook-shaped member.

* * * * *